United States Patent
Shimizu et al.

[11] Patent Number: 6,102,147
[45] Date of Patent: Aug. 15, 2000

[54] AUTOMATIC STEERING SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/059,390

[22] Filed: Apr. 14, 1998

[30]  Foreign Application Priority Data

Apr. 15, 1997  [JP]  Japan ..................................... 9-097602

[51] Int. Cl.⁷ ...................................................... B60S 9/00
[52] U.S. Cl. ........................... 180/204; 180/199; 701/23; 701/25; 701/26
[58] Field of Search .................... 180/199, 204; 701/23, 25, 26, 41

[56]  References Cited

U.S. PATENT DOCUMENTS

| | | | |
|---|---|---|---|
| 4,735,274 | 4/1988 | Good et al. | 180/204 |
| 4,931,930 | 6/1990 | Shyu et al. | 180/204 |
| 5,742,141 | 4/1998 | Czekaj | 180/199 |

FOREIGN PATENT DOCUMENTS

| | | | |
|---|---|---|---|
| 1-219907 | 9/1989 | Japan | 180/204 |
| 3-74256 | 3/1991 | Japan . | |
| 4-55168 | 2/1992 | Japan . | |

*Primary Examiner*—Daniel G. DePumpo
*Attorney, Agent, or Firm*—Arent, Fox Kintner Plotkin & Kahn

[57]  ABSTRACT

In carrying out an automatic steering control for the vehicle, a deviation between an actual locus of movement of a vehicle and a standard locus of movement is corrected, so that the vehicle can be accurately guided to a target position. An automatic steering system for a vehicle is designed so that a steering actuator is driven based on a previously stored standard steering angle, to automatically guide the vehicle to a target position. In this automatic steering system, if the deviation between an actual steering angle of the vehicle which is detected and the standard steering angle, exceeds a predetermined value, the standard steering angle is corrected, so that the deviation is decreased. If the steering actuator is driven based on the corrected standard steering angle, the actual steering angle is corrected, whereby the vehicle can accurately reach the original target position.

6 Claims, 5 Drawing Sheets

—— STANDARD STEERING ANGLE
----- ACTUAL STEERING ANGLE

AUTOMATIC STEERING SYSTEM FOR VEHICLE

BACKGROUND OF THE INVENTION

1. Field of the Invention

The present invention relates to an automatic steering system for a vehicle for automatically parking the vehicle without recourse to steering by a driver.

2. Description of the Prior Art

Automatic steering systems for vehicles are already known from Japanese Patent Application Laid-Open Nos. 3-74256 and 4-55168. These automatic steering systems for vehicles utilize an actuator for a conventional well-known electric power steering system, and are designed so that reverse parking or longitudinal parking is automatically performed by controlling the actuator based on a previously stored relationship (a standard locus of movement) between the traveling distance of the vehicle and the steering angle.

In the above conventional system, it is necessary to steer the wheel more rapidly, as the vehicle speed becomes higher. However, if the weight of a load on the vehicle is large, or if the road surface friction coefficient is high, a larger force is required for the steering. For this reason, if the performance of the actuator is low, the vehicle cannot be moved with a good accuracy on the standard locus of movement and as a result, the vehicle cannot correctly reach the target position, in some cases.

SUMMARY OF THE INVENTION

The present invention has been accomplished with the above circumstance in view, and it is an object of the present invention to correct the deviation between the actual locus of movement and the standard locus of movement of the vehicle to correctly guide the vehicle to the target position.

To achieve the above object, there is provided an automatic steering system for a vehicle, comprising a standard movement locus setting means for storing or calculating a standard locus of movement of a vehicle to a target position, an actuator adapted to steer a wheel, and an actuator-driving control means coupled to said actuator, for driving the actuator so that the vehicle is directed along the standard locus of movement. The automatic steering system further includes an actual movement locus detecting means for detecting an actual locus of movement of the vehicle, a deviation calculating means for calculating a deviation between the actual locus of movement and the standard locus of movement, and a correcting means for correcting the output from the standard movement locus setting means, so that the deviation is decreased in the course of movement of the vehicle to the target position.

With the above arrangement, if a deviation is generated between the actual locus of movement and the standard locus of movement of the vehicle, the deviation is decreased in the course of movement of the vehicle to the target position and hence, the vehicle can be correctly guided to the target position.

The actual movement locus detecting means detects the actual locus of movement based on the traveling distance of the vehicle and the steering angle of the wheels. With the above arrangement, the actual locus of movement can be accurately detected by performing only a simple calculation.

The standard locus of movement comprises a first standard locus of movement from a start position to a reversing position, and a second standard locus of movement from the reversing position to a target position. After the deviation generated during movement of the vehicle through the first standard locus of movement is corrected, the movement of the vehicle through the standard locus of movement from the reversing position is started.

With the above arrangement, even if a deviation is generated between the actual locus of movement and the standard locus of movement of the vehicle, the deviation is corrected at the reversing position at the end of the first standard locus of movement. Therefore, it is possible to prevent the deviation from being brought into the vehicle steering control based on the second standard locus of movement.

DETAILED DESCRIPTION OF THE PREFERRED EMBODIMENT

Figure 1:
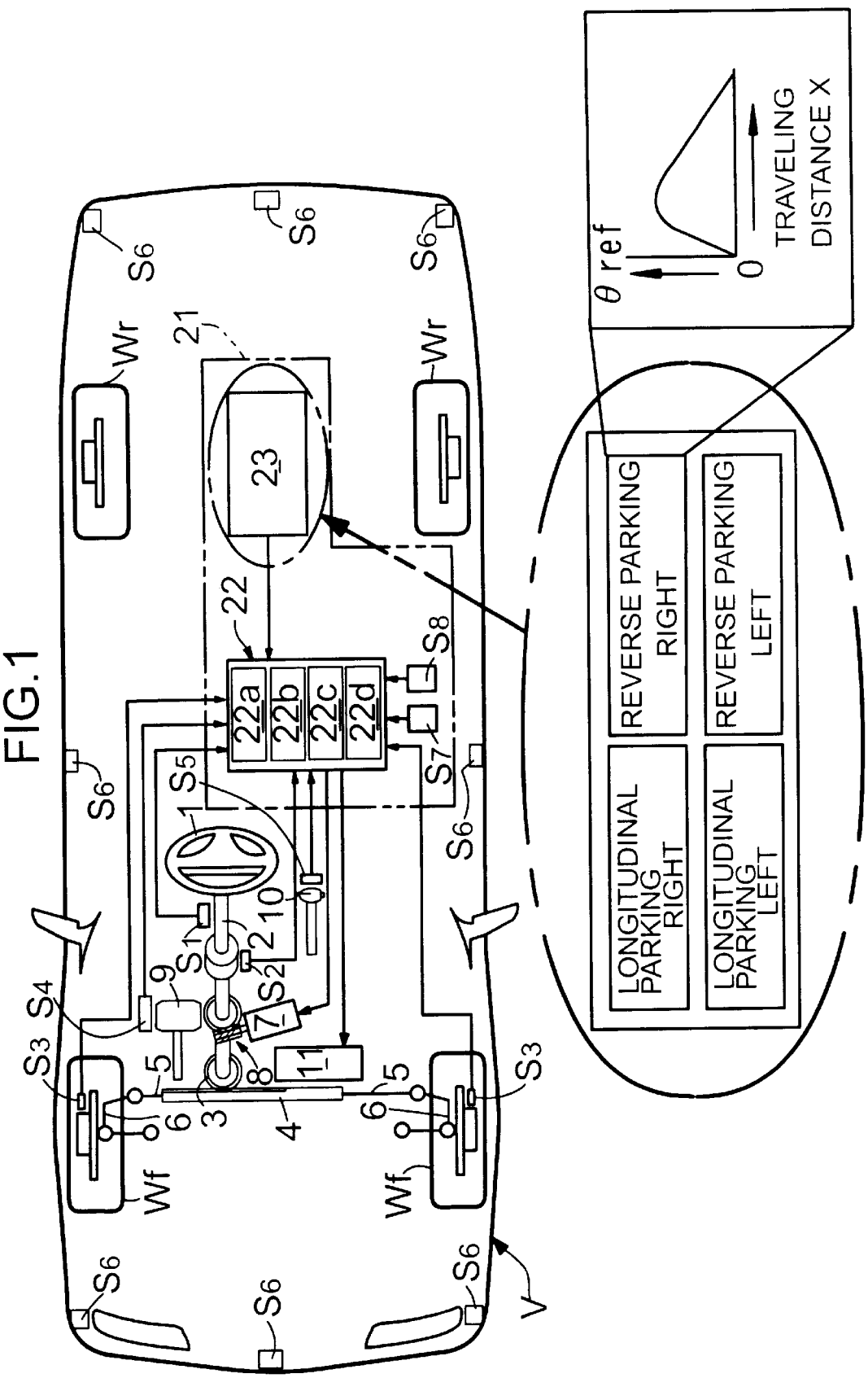
FIG. 1 is an illustration of the entire arrangement of a vehicle equipped with a steering control unit according to an embodiment of the present invention.

As shown in FIG. 1, a vehicle V includes a pair of front wheels Wf, Wf and a pair of rear wheels Wr, Wr. A steering wheel 1 and the front wheels Wf, Wf which are the steered wheels are interconnected by a steering shaft 2 rotated in unison with the steering wheel 1, a pinion 3 provided at a lower end of the steering shaft 2, a rack 4 meshed with the pinion 3, left and right tie rods 5 provided at opposite ends of the rack 4, and left and right knuckles 6 connected to the tie rods 5. A steering actuator 7 having an electric motor, is connected to the steering shaft 2 through a worm gear mechanism 8, in order to assist in the operation of the steering wheel 1 by a driver, or to conduct automatic steering for garaging of the vehicle which will be described hereinafter.

A steering control unit 21 comprises a controller 22 and a storage means 23. Inputted to the controller 22 are signals from a steering angle detecting means $S_1$ for detecting a steering angle θ of the front wheels Wf, Wf based on the rotational angle of the steering wheel 1, a steering torque detecting means $S_2$ for detecting a steering torque of the steering wheel 1, front wheel rotational angle detecting means $S_3$, $S_3$ for detecting rotational angles of the left and right front wheels Wf, Wf, a brake operational amount detecting means $S_4$ for detecting the operational amount of a brake pedal 9 as a brake input means, a shift range detecting means $S_5$ for detecting the shift range selected by a select lever 10 (a "D" range, an "R" range, an "N" range, a "P" range or the like), and eight object detecting means $S_6$ mounted at a front portion, a central portion and a rear portion of the vehicle V. The object detecting means $S_6$ may be any known type of detecting means, such as sonar, radar, television camera or the like. Lines connecting the eight object detecting means $S_6$ and the controller 22 are omitted from the drawings for the purpose of preventing the complication of the drawings. The storage means 23 functions as a standard movement locus setting means.

Further, a mode selecting switch $S_7$ and an automatic parking start switch $S_8$ operated by the driver, are connected to the controller 22. The mode selecting switch $S_7$ is operated to select any of four parking modes: a reverse-parking/right mode, a reverse-parking/left mode, a longitudinal parking/right mode, and a longitudinal parking/left mode. The automatic parking start switch $S_8$ is operated to start automatic parking in any mode selected by the mode selecting switch $S_7$.

Data for a standard locus of movement for the four parking modes, i.e., relationships of standard steering angles θref to traveling distances X of the vehicle V are previously stored as a table in the storage means 23. The traveling distance X of the vehicle V is calculated by multiplying the known peripheral length of the front wheel Wf by the rotational angle of the front wheel Wf detected by the front wheel rotational-angle detecting means $S_3$. Either one of a high-select value and a low-select value outputted from the pair of left and right front wheel rotational-angle detecting means $S_3$, $S_3$, and an average value of the high-select value and the low-select value is used for the calculation of the traveling distance X.

The controller 22 includes an actual movement locus detecting means 22a, a deviation calculating means 22b, a correcting means 22c, and an actuator driving control means 22d, and controls the operation of the steering actuator 7 and the operation of an operational stage display device 11 including a liquid crystal monitor, a speaker, a lamp, a chime, a buzzer or the like, based on the signals from the detecting means $S_1$ to $S_6$ and the switches $S_7$ and $S_8$, and the data for the parking modes stored in the storage means 23.

The actual movement locus detecting means 22a detects an actual locus of movement of the vehicle V based on a steering angle θ detected by the steering angle detecting means $S_1$ and a traveling distance X of the vehicle V calculated based on outputs from the front wheel rotational angle detecting means $S_3$. The deviation calculating means 22b calculates the deviation between the actual locus of movement and the standard locus of movement stored in the storage means 23 by comparing both the loci. The correcting means 22c corrects the deviation to control the driving of the steering actuator 7 through the actuator driving control means 22d in order to correctly guide the vehicle V into a target position.

The operation of the embodiment of the present invention having the above-described arrangement will be described below.

When the vehicle is in a normal state in which automatic parking is not carried out (when the automatic parking start switch $S_8$ is not in an ON state), the steering control unit 21 functions as a regular power-steering control unit. More specifically, when the steering wheel 1 is operated by the driver to turn the vehicle V, the steering torque detecting means $S_2$ detects a steering torque inputted to the steering wheel 1, and the actuator-driving control means 22b controls the driving of the steering actuator 7 based on the steering torque. As a result, the left and right front wheels Wf, Wf are steered by the driving force from the steering actuator 7, whereby the steering operation provided by the driver is assisted.

The contents of an automatic parking control will be described with the reverse parking/left mode, (the mode in which parking is conducted while the vehicle is being moved backwards to a parking position lying on the left side of the vehicle V) taken as an example.

Figure 2A:
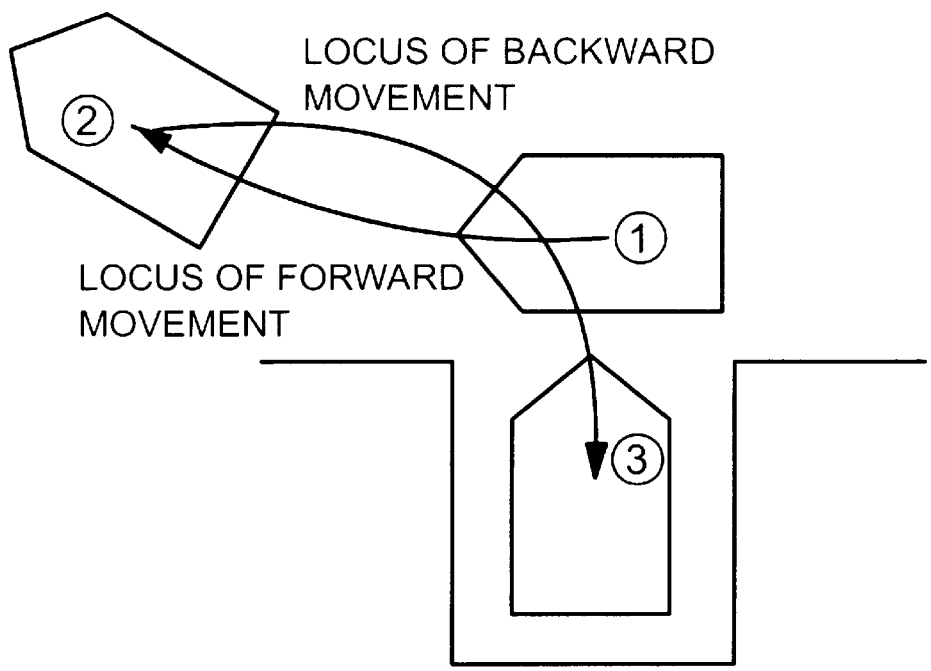
FIGS. 2A and 2B are illustrations for explaining the operation in a reverse parking/left mode.

First, as shown in FIG. 2A, the vehicle V is moved close to a garage where the vehicle V is to be parked, with the left side of the vehicle body located as close as possible to an inlet line of the garage. The vehicle V is stopped at a position (a start position (1)) at which a predetermined reference point (e.g., a left sideview mirror) is matched with the center line of the garage. When the mode selecting switch $S_7$ is operated to select the reverse parking/left mode and the automatic parking start switch $S_8$ is turned ON, the automatic parking control is started. While automatic parking control is being conducted, the current position of the vehicle, surrounding obstacles, the parking position, a standard locus of movement of the vehicle from the start position to the parking position, the reversing position for switch-over from forward movement to backward movement and the like are indicated on the operational stage display device 11. In addition, various instructions and warnings such as for the operation of the select lever 10 at the reversing position and the like are emitted by voice from the speaker to the driver.

When the brake pedal 9 is loosened by the driver, to perform the creep travel of the vehicle V, the front wheels Wf, Wf are automatically steered based on the data for the reverse parking/left mode selected by the mode selecting switch $S_7$, even if the steering wheel 1 is not operated. More specifically, while the vehicle is being moved forwards from the start position (1) to the reversing position (2), the front wheels Wf, Wf are automatically steered to the right. While the vehicle is being moved backwards from the reversing position (2) to the target position (3), the front wheels Wf, Wf are automatically steered to the left.

Figure 2B:
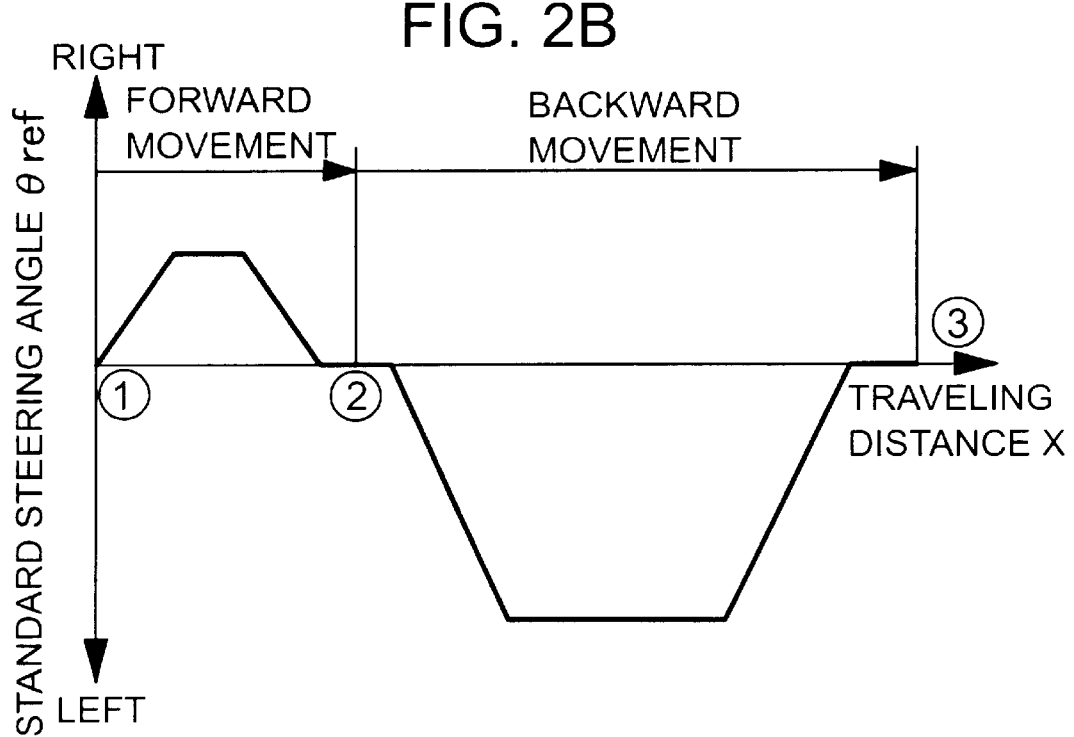

As can be seen from FIG. 2B, while automatic steering is being carried out, the actuator-driving control means 22d calculates a deviation E=θref−θ based on a standard steering angle θref in the reverse parking/left mode read out from the storage means 23 and the steering angle θ inputted from the steering angle detecting means $S_1$, and controls the operation of the steering actuator 7, so that the deviation E is equal to 0. At this time, data of the standard steering angle θref is set in correspondence to the traveling distance X of the vehicle V and hence, even if there is a variation in vehicle speed during creep travel, the vehicle is always moved on the standard locus of movement.

Figure 3A:
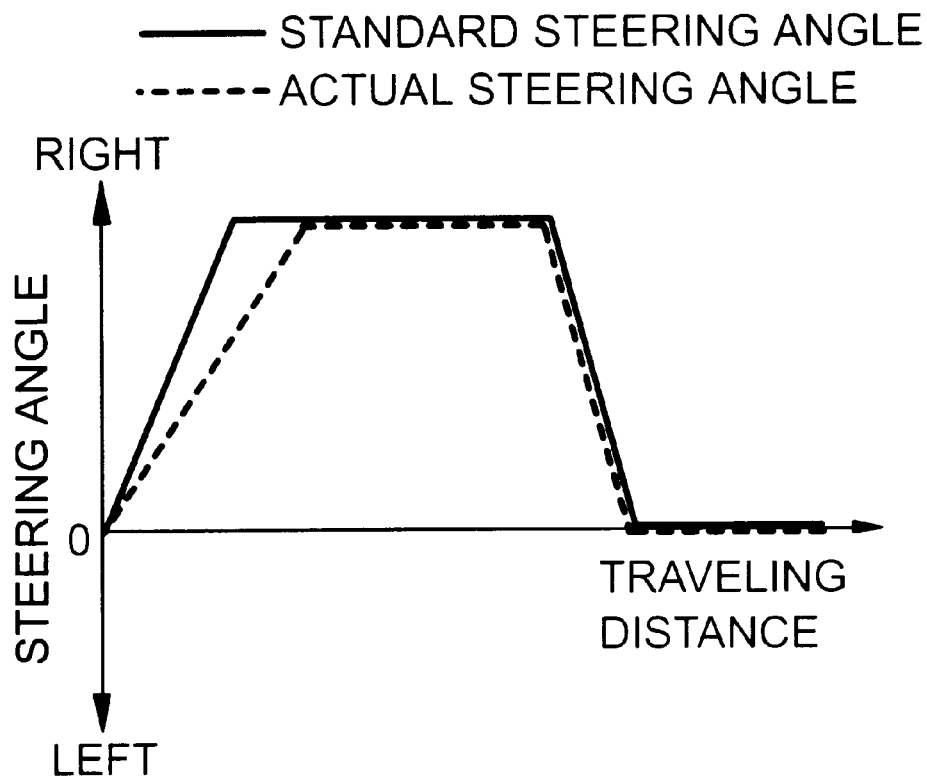
FIGS. 3A and 3B are illustrations for explaining the deviation between a standard locus of movement and an actual locus of movement.
Figure 3B:
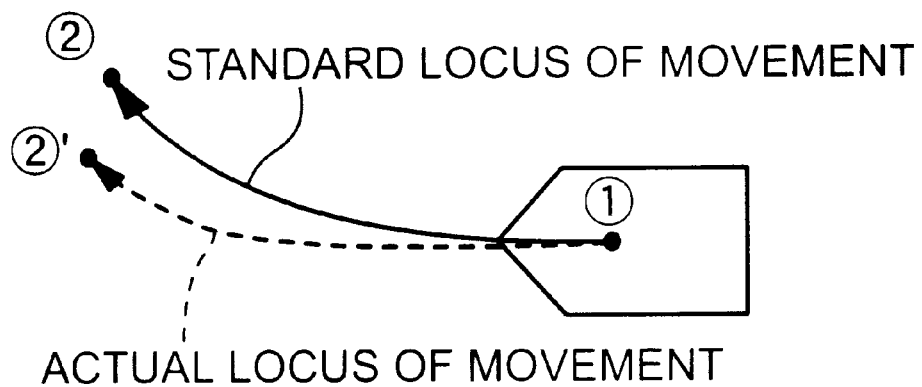

The solid lines in FIG. 3 indicate a standard steering angle θref and a standard locus of movement (a first standard locus of movement) from the start portion (1) to the reversing position (2) when automatic parking is to be carried out in the reverse parking/left mode. In this case, if the actual steering angle θ is as shown by a dashed line in FIG. 3A, for example, due to a delay in response from the steering actuator 7, a deviation is produced between the actual steering angle θ and the standard steering angle θref shown by the solid line. The actual locus of movement of the vehicle V is thus not matched with the standard locus of movement as shown in FIG. 3B, and the reversing position is also deviated from the original position (2) to a position (2)'.

Figure 4A:
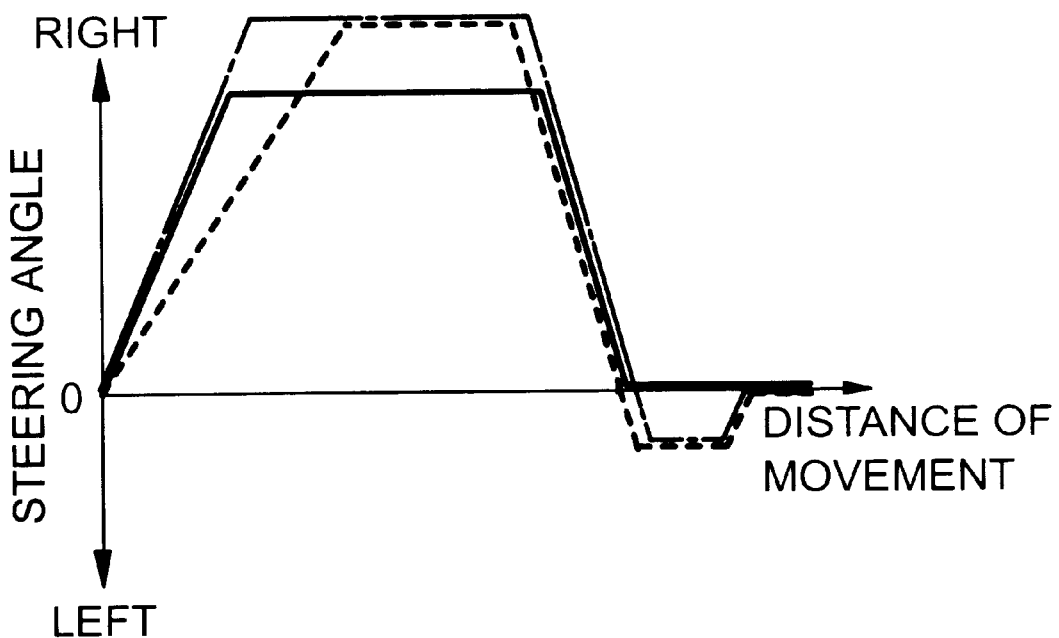
FIGS. 4A and 4B are illustrations showing an example of movement locus correcting techniques.
Figure 4B:
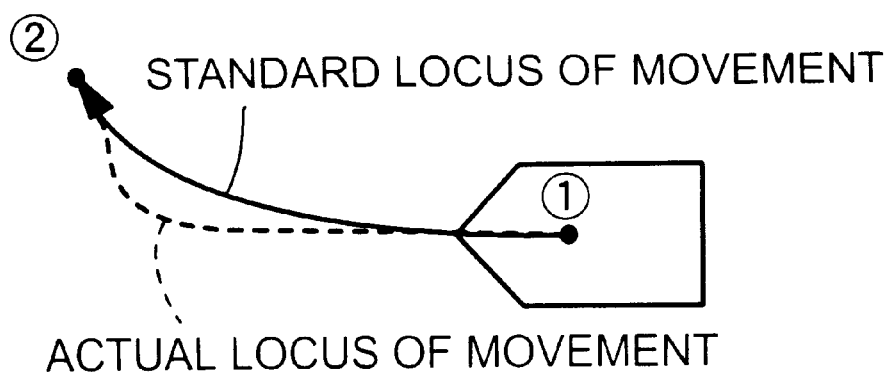

The actual locus of movement of the vehicle V from the start position (1) to the reversing position (2) is detected by the actual movement locus detecting means 22a, and the deviation between the actual locus of movement and the standard locus of movement is calculated by the deviation calculating means 22b. If the calculated deviation exceeds a predetermined value, the correcting means 22c corrects the standard steering angle θref, thereby permitting the vehicle V to be guided to the original reversing position (2). More specifically, if the initial actual steering angle θ is less relative to the standard steering angle θref due to a delay in response of the steering actuator 7, correction is performed in a direction to increase the maximum value of the standard steering angle θref, as shown by a dashed line in FIG. 4A. Further, if the vehicle is close to the reversing position (2), the front wheels Wf, Wf are slightly steered in the opposite direction (a left direction) based on the corrected standard steering angle θref, thereby permitting the vehicle V to be correctly guided to the reversing position (2), as shown in FIG. 4B.

Figure 5A:
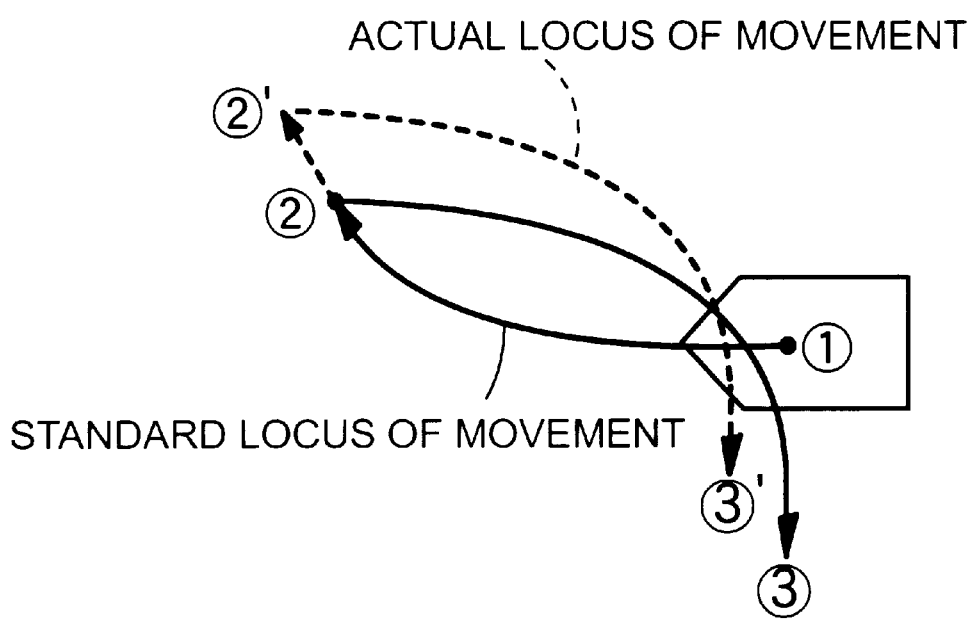
FIGS. 5A and 5B are illustrations showing another example of a movement locus correcting technique.
Figure 5B:
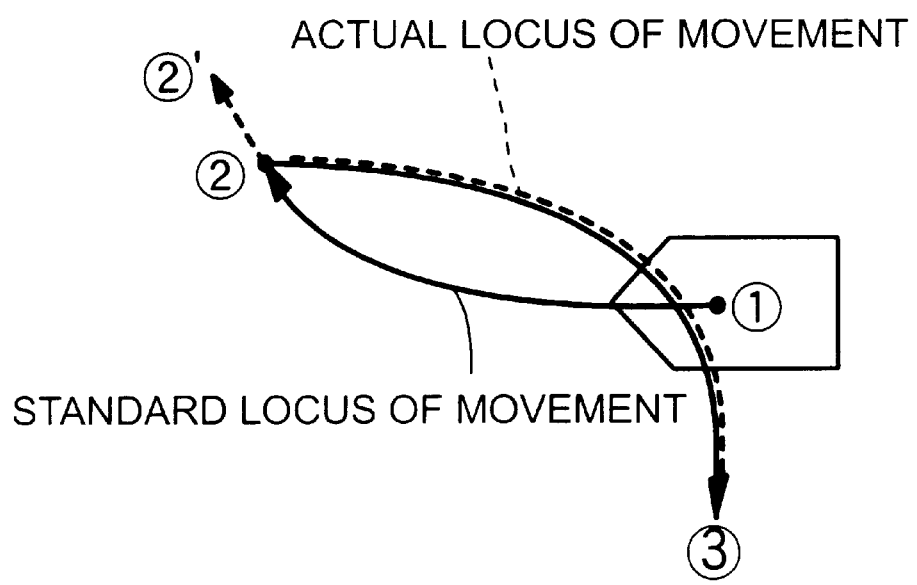

It is supposed that when the vehicle V is moved through the first standard locus of movement from the start position (1) to the reversing position (2) by the automatic parking control, as shown in FIG. 5A, the vehicle V is moved past the original reversing position (2) and stopped at the position (2)' due to a shift change delay. If automatic parking control is continued from this state based on a previously stored second half of the standard locus of movement (the second standard locus of movement), the following problem arises: the vehicle V reaches a position (3)' deviated from an original target position (3). Therefore, an actual locus of movement from the position (3) to the position (3)' is stored, and when the vehicle V is moved backwards, the stored actual locus of movement is reversely regenerated, whereby the vehicle V can be returned to the original reversing position (2) and then guided to the original target position (3) by continuing the automatic parking control based on the second standard locus of movement, as shown in FIG. 5B.

In this way, by starting the movement of the vehicle V based on the second standard locus of movement from the reversing position (2) after correction of the positional deviation generated during movement of the vehicle V through the first standard locus of movement, the positional deviation can be prevented from affecting the steering control of the vehicle V based on the second standard locus of movement, thereby guiding the vehicle V to the target position (3) with a good accuracy.

The above-described automatic parking control is canceled when the driver has turned OFF the mode selecting switch $S_7$. In addition, when the driver releases his foot from the brake 9, or when the driver operates the steering wheel 1, or when any of the object detecting means $S_6$ detects an obstacle, the automatic parking control is canceled and restored to the normal power-steering control.

The standard locus of movement of the vehicle V to the target position is previously stored in the storage means 23 in the above embodiment, but a situation around the vehicle V may be detected by the object detecting means $S_6$ and the like at the start of the automatic parking control at the start position, and a locus of movement to the target position may be calculated and stored as a standard locus of movement in the storage means 23. The automatic parking control may be carried out based on this standard locus of movement. In addition, not limited to the time of the start of automatic parking control, a standard locus of movement from the reversing position to the target position can be, of course, likewise calculated and stored at the reversing position on the way.

As discussed above, the deviation between the detected actual locus of movement of the vehicle and the standard locus of movement is calculated, and the output from the standard movement locus setting means is corrected, so that the deviation is decreased in the course of movement of the vehicle to the target position. Therefore, the vehicle can be guided with a good accuracy to the target position.

The actual movement locus detecting means detects the actual locus of movement, based on the traveling distance of the vehicle and the steering angle of the wheel. Therefore, the actual locus of movement can be accurately detected by performing only a simple calculation.

The standard locus of movement comprises a first standard locus of movement from a start position to a reversing position, and a second standard locus of movement from the reversing position to a target position. After the deviation generated during movement of the vehicle through the first standard locus of movement is corrected, the movement of the vehicle through the second standard locus of movement from the reversing position is started. Therefore, even if a deviation is generated between the actual locus of movement and the standard locus of movement, the vehicle can be guided with good accuracy to the target position in a manner to prevent any effect on the vehicle steering control based on the second standard locus of movement, by correcting the deviation at the reversing position at the end of the first standard locus of movement.

Although the above embodiment has been described in detail, it will be understood that the present invention is not limited to the above-described embodiment, and various modifications in design may be made without departing from the subject matter of the present invention.

What is claimed is:

1. An automatic steering system for a vehicle, comprising:
   a standard movement locus setting means for storing a locus, which is previously calculated, as a standard locus of movement of a vehicle to a target position,
   an actuator for steering a wheel,
   an actuator-driving control means coupled to said actuator, for driving said actuator such that the vehicle is directed along the standard locus of movement,
   an actual movement locus detecting means for detecting an actual locus of movement of the vehicle,
   a deviation calculating means for calculating a deviation between the actual locus of movement and the standard locus of movement, and
   a correcting means for correcting an output from said standard movement locus setting means, wherein the deviation is decreased in the course of movement of the vehicle to the target position.

2. An automatic steering system for a vehicle according to claim 1, wherein said actual movement locus detecting means detects the actual locus of movement based on a traveling distance of the vehicle and a steering angle of the wheel.

3. An automatic steering system for a vehicle according to claim 1 or 2, wherein the standard locus of movement comprises a first standard locus of movement from a start position to a reversing position, and a second standard locus of movement from the reversing position to the target position, and wherein the standard locus of movement from the reversing position is started after the deviation generated during movement of the vehicle along the first standard locus of movement is corrected.

4. An automatic steering system for a vehicle, comprising:
   a standard movement locus setting means for calculating a standard locus of movement of a vehicle to a target position,
   an actuator for steering a wheel,
   an actuator-driving control means coupled to said actuator, for driving said actuator such that the vehicle is directed along the standard locus of movement,
   an actual movement locus detecting means for detecting an actual locus of movement of the vehicle, a deviation calculating means for calculating a deviation between the actual locus of movement and the standard locus of movement, and a correcting means for correcting an output from said standard movement locus setting means, wherein the deviation is decreased in the course of movement of the vehicle to the target position.

5. An automatic steering system for a vehicle according to claim 4, wherein said actual movement locus detecting means detects the actual locus of movement based on a traveling distance of the vehicle and a steering angle of the wheels.

6. An automatic steering system for a vehicle according to claim 4 or 5, wherein the standard locus of movement comprises a first standard locus of movement from a start position to a reversing position, and a second standard locus of movement from the reversing position to the target position, and wherein the standard locus of movement from the reversing position is started after the deviation generated during movement of the vehicle along the first standard locus of movement is corrected.

\* \* \* \* \*